Figure 1:
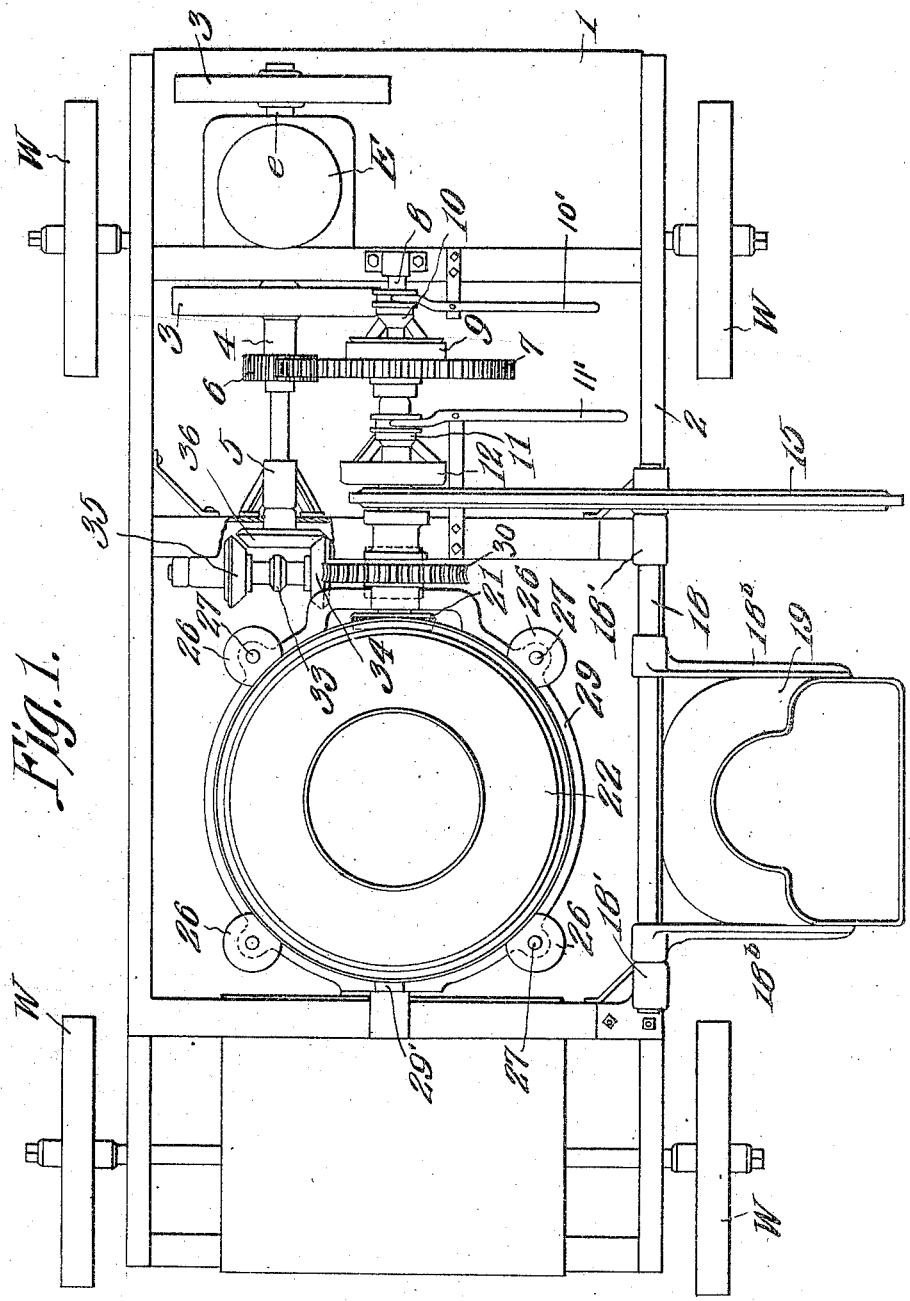

S. J. MORGAN.
TRANSMISSION MECHANISM FOR CONCRETE MIXERS.
APPLICATION FILED SEPT. 2, 1914.

1,184,482.

Patented May 23, 1916.
3 SHEETS—SHEET 1.

Witnesses

S. J. Morgan,
Inventor by
Attorneys

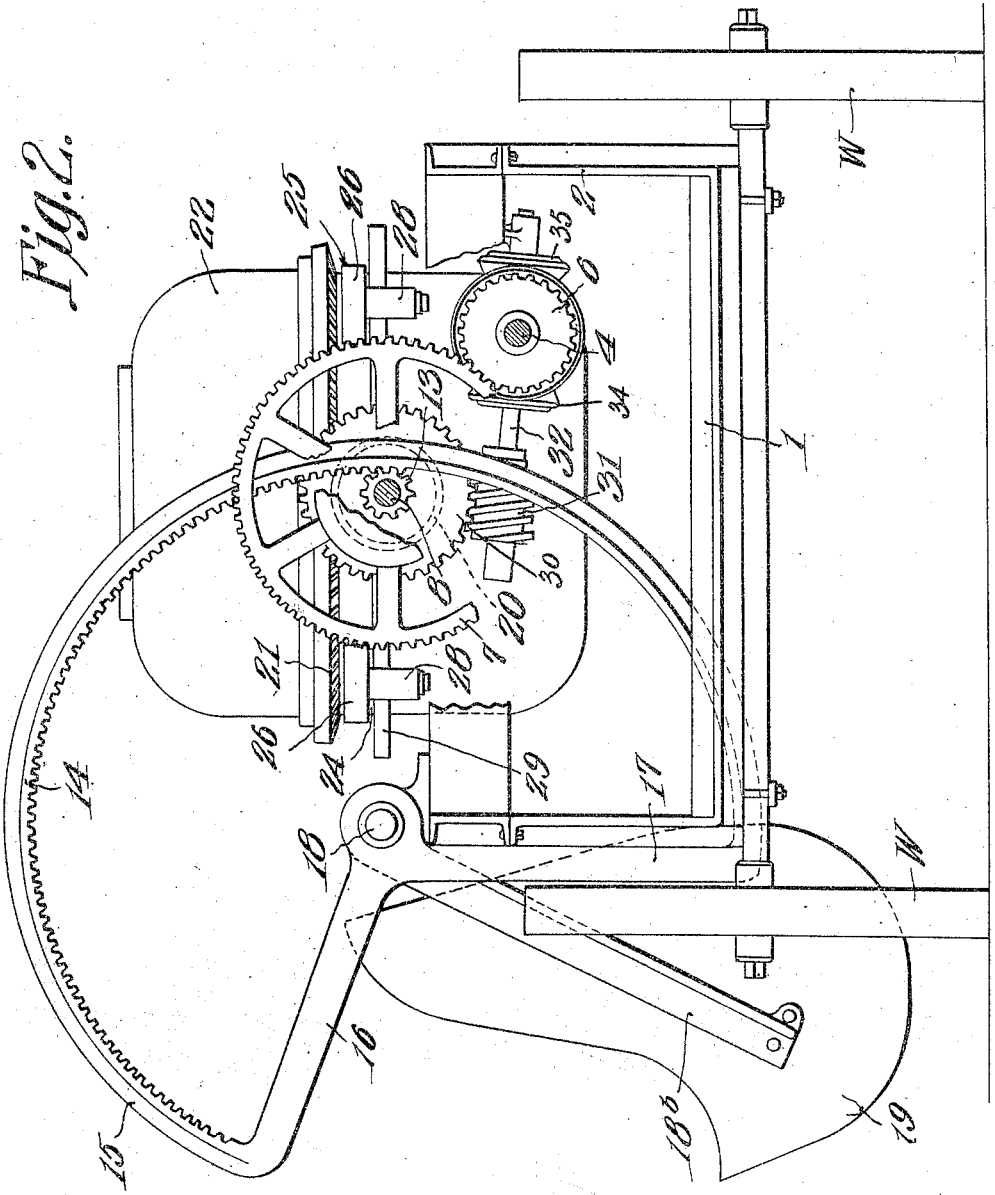

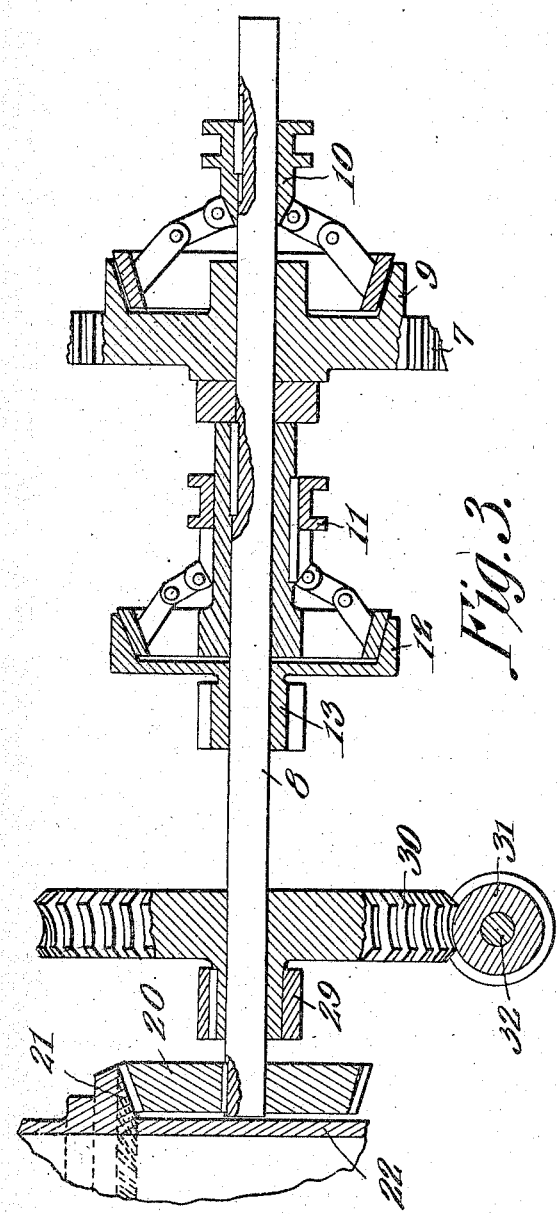
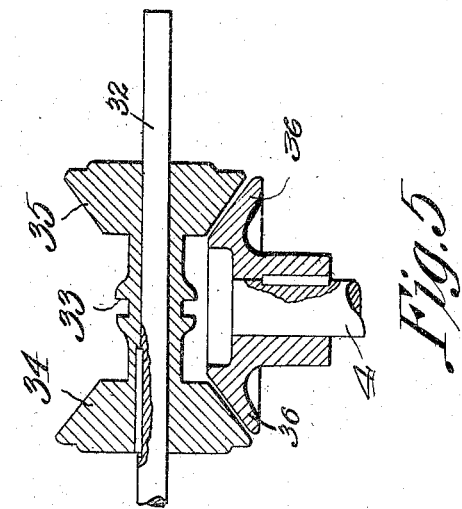
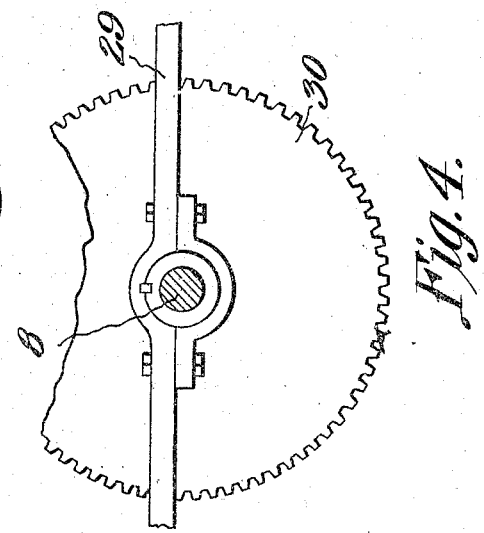

UNITED STATES PATENT OFFICE.

SAXTON J. MORGAN, OF ALBANY, WISCONSIN.

TRANSMISSION MECHANISM FOR CONCRETE-MIXERS.

1,184,482.   Specification of Letters Patent.   Patented May 23, 1916.

Application filed September 2, 1914. Serial No. 859,850.

*To all whom it may concern:*

Be it known that I, SAXTON J. MORGAN, a citizen of the United States, residing at Albany, in the county of Green and State of Wisconsin, have invented a new and useful Transmission Mechanism for Concrete-Mixers, of which the following is a specification.

The present invention relates to improvements in transmission mechanisms for concrete mixers, one object of the invention, being the provision of a transmission mechanism between an oscillatory or swingingly mounted driven member and an axially rotatable driven member and a driving mechanism such as an explosion engine, whereby the selective driven members may be operated singly or jointly, the axially rotatable driven member constituting a mixing drum while the tilting member constitutes the annular member which carries the mixing drum, the drum therefor being rotatable within the annular member and the annular member oscillatable upon its axis.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings Figure 1 is a top plan view of the complete mixer embodying the present invention. Fig. 2 is an end view thereof, parts of it being broken away to demonstrate the gearing, the explosion engine being omitted. Figs. 3, 4 and 5 are detail views of various parts of the mechanism.

Referring to the drawings, the numeral 1 designates the framework which is mounted upon wheels W so that the present device may be transported from place to place. The open rectangular frame 2 constitutes the supporting frame for the mechanism, the explosion engine E being mounted at the front thereof, as clearly illustrated in Fig. 1, and having the shaft 4 thereof coaxial with and connected to the crank shaft *e* carrying the fly wheel 3 of the engine. The opposite end of the shaft 4 is mounted in the bracket bearing 5 and as the engine rotates, the shaft 4 will be rotated. Mounted upon the shaft 4 is a small pinion 6, which meshes with the large gear 7, said gear 7 being mounted for free rotation upon the shaft 8, which is journaled in parallel to the shaft 4, said gear 7 being provided with one clutch member 9 for coaction with the spool 10 which is splined upon the shaft 8 for rotation therewith. By this means, when the clutch spool 10 is operated by the lever 10′ to engage the clutch 9, the gear 7 is made fast to the shaft 8 and thus the shaft 8 is rotated through the shaft 4 and gear 6. Also mounted upon the shaft 8 is a clutch spool 11, which is controlled by the lever 11′ and is disposed to coöperate with the clutch member 12 which in turn carries the small gear 13 disposed to engage the gear teeth 14 formed internally upon the segmental frame 15. This frame 15 is provided with the two arms 16 and 17, and with the shaft 18. This shaft 18 is disposed longitudinally of the frame, and is journaled for rotation in brackets 18′, while the two arms 18ᵇ carry the filling hopper or scoop 19.

Keyed upon and rotatable with the shaft 4 is a beveled gear 20, which is disposed to mesh with and engage the beveled gear 21 carried by the mixing drum or chamber 22, the latter being open only at one end so that the chamber may be disposed to receive the load from the loading scoop at one side of the frame and tilted to deliver the mixed contents at the opposite side. The beveled gear 21 and the rim 24 provide a roller receiving space 25 so that the rollers 26 which encircle the mixing drum 22 will permit of the drum being properly rotated therein and within the roller carrying frame 29, which carries the sleeves 28 in which are mounted the stems 27 of the rollers 26.

In order to impart rotation or oscillation to the mixer 22 from the receiving position to the emptying position, such emptying position being to the right, (Fig. 2), the gear 30 is attached to the trunnion frame 29, while the shaft 29′ constitutes the bearing therefor at the opposite side. Meshing with the gear 30 is the worm gear 31 which is keyed upon and rotatable with the shaft 32, which in turn is journaled as illustrated in Fig. 2, so as to have the friction members 34 and 35 carried by the manually controlled collar 33 to place one at a time in engagement with the member 36, and as the shaft 4 is rotated, the desired oscillation will be imparted to the cement mixing drum. When the members 34 and 35 are in neutral position, the mixing chamber may be maintained in either position for receiving or emptying the load.

What is claimed is:

1. In a device of the class described, a prime mover embodying a drive shaft; a tilting frame; a rotatable member journaled on the frame; an actuating shaft disposed parallel to the drive shaft; an operative connection between the shafts and including an element rotatable upon one shaft; clutch means for uniting the rotatable element with its shaft whereby the actuating shaft may be driven from the prime mover; intermeshing gears on the actuating shaft and the frame carried rotatable member whereby the frame carried member will be rotated when the actuating shaft is rotated; a third shaft disposed at right angles to the drive shaft and the actuating shaft; an operative connection between the third shaft and the frame whereby the frame will be tilted when the third shaft is rotated; a gear wheel fixed to the drive shaft; and selective gears splined to the third shaft and adapted to coact respectively with the gear wheel of the drive shaft to effect a tilting of the frame in opposite directions.

2. In a device of the class described, a prime mover embodying a drive shaft; a tilting frame; a rotatable member journaled in the frame; an actuating shaft disposed parallel to the drive shaft; a pinion fixed to the drive shaft; a pinion loose on the actuating shaft; a clutch forming an operative connection between the last specified pinion and the actuating shaft; a gear on the rotatable member; a pinion on the actuating shaft and meshing into the gear on the rotatable member; a third shaft disposed at right angles to the drive shaft and the actuating shaft; a worm wheel operatively connected with the frame; a worm on the third shaft and meshing into the worm wheel; a beveled gear fixed to the drive shaft; and a pair of beveled gears splined to the third shaft for selective engagement with the beveled gear on the drive shaft.

In testimony that I claim the foregoing as my own, I have hereto affixed my signature in the presence of two witnesses.

SAXTON J. MORGAN.

Witnesses:
VICTOR ZENTNER,
MARION A. PHELPS.